United States Patent [19]

Lemme et al.

[11] Patent Number: 4,653,468
[45] Date of Patent: Mar. 31, 1987

[54] COOKWARE HANDLE

[75] Inventors: Charles D. Lemme; Tracy R. Lemme, both of Tucson, Ariz.

[73] Assignee: Copernicus Corporation, Tucson, Ariz.

[21] Appl. No.: 818,247

[22] Filed: Jan. 13, 1986

[51] Int. Cl.[4] .............................................. A47J 27/00
[52] U.S. Cl. .................................. 126/373; 126/390; 16/110 A; 16/114 A
[58] Field of Search ............. 126/373, 390; 16/110 A, 16/113, 119, 120, 114 A; D7/360, 361; 220/94 R; 81/491, 492; 7/167

[56] References Cited

U.S. PATENT DOCUMENTS

| D. 67,392 | 4/1923 | Bennett . | |
|---|---|---|---|
| D. 165,531 | 8/1950 | Lebherz . | |
| D. 200,332 | 2/1965 | Lee . | |
| D. 244,344 | 5/1977 | Rheingold . | |
| 280,274 | 6/1883 | Wilson . | |
| 452,121 | 5/1891 | Kendrick | 16/114 A |
| 901,400 | 10/1908 | Vincent | 16/110 A |
| 1,625,655 | 9/1926 | Hardie . | |
| 2,025,607 | 12/1935 | Noxon | 16/110 A |
| 2,044,388 | 6/1936 | Gundelfinger | 16/114 A |
| 3,207,059 | 10/1962 | Hirons . | |
| 4,038,719 | 8/1977 | Bennett | 16/110 R |

FOREIGN PATENT DOCUMENTS

| 535213 | 1/1922 | France | 16/114 A |
|---|---|---|---|
| 560026 | 6/1923 | France | 16/120 |
| 607077 | 3/1926 | France | 16/110 A |
| 1093759 | 11/1954 | France | 16/114 A |
| 141155 | 4/1920 | United Kingdom | 16/110 A |

Primary Examiner—Samuel Scott
Assistant Examiner—H. A. Odar
Attorney, Agent, or Firm—Willian Brinks Olds Hofer Gilson & Lione Ltd.

[57] ABSTRACT

A cooking pan includes a handle made up of a tubular stainless steel insert and upper and lower wires. The upper wire wraps around the insert and is welded at each end to the pan body. The lower wire is welded at one end to the pan body and at the other end to the insert. The wires provide three struts connecting the insert and the pan body, and are formed of a configuration and material adapted to minimize heat transfer to the insert. In this way an all-metal handle is provided which does not heat excessively in use. Preferably the insert is inclined upwardly towards the pan at an angle of 25° to increase the comfort of the user.

4 Claims, 4 Drawing Figures

U.S. Patent  Mar. 31, 1987  4,653,468
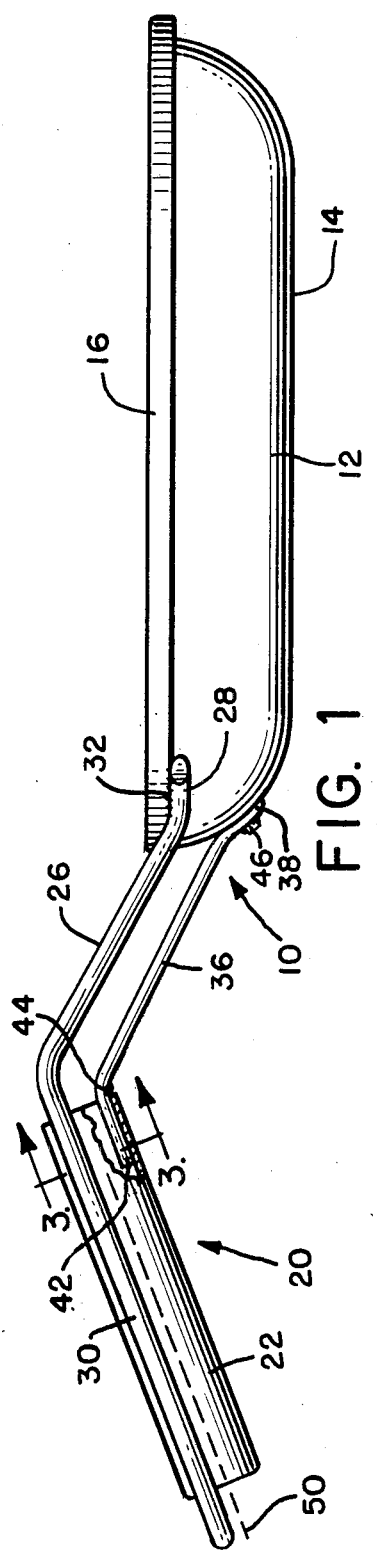
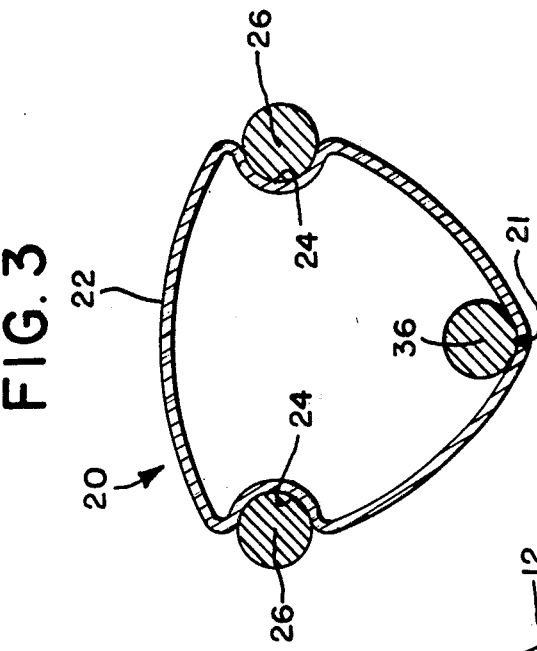
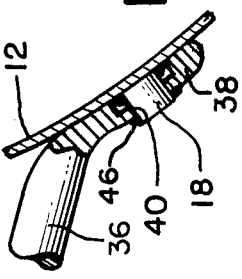
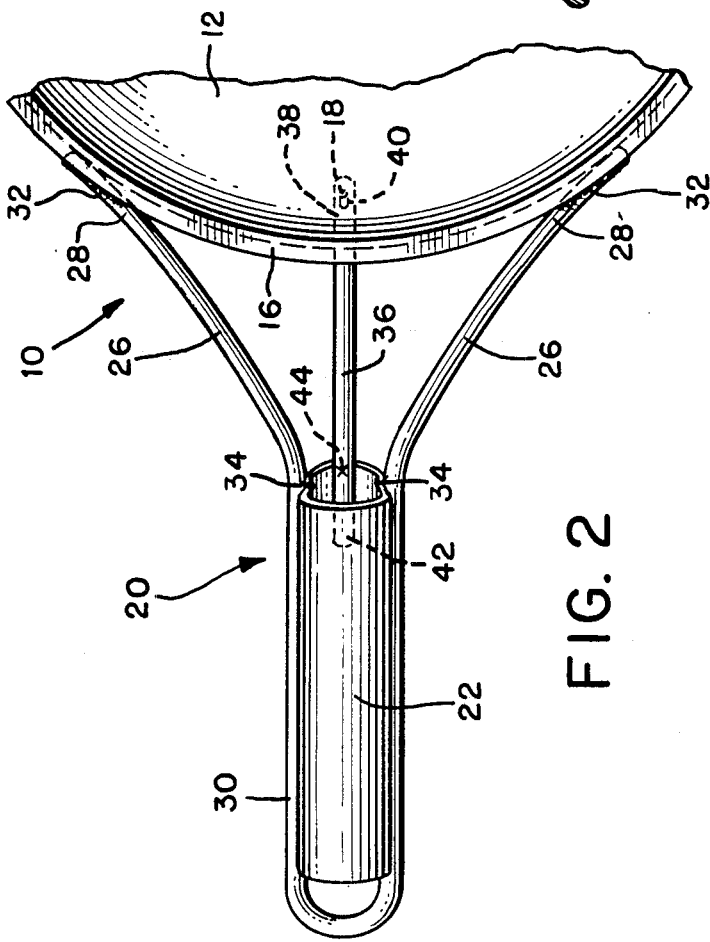

COOKWARE HANDLE

BACKGROUND OF THE INVENTION

The present invention relates to an improved handle for cookware such as pans, skillets, pots and the like.

In the past, it has been common practice to utilize cookware handles made of thermally insulating materials such as wood or plastic. Such materials may prevent the handle from becoming excessively hot in use, but they can often limit the utility of the cookware. For example, wood or plastic handles typically cannot be used under a broiler. Another class of cookware is provided with metal handles which tend to heat excessively when the cookware is used in stovetop cooking.

SUMMARY OF THE INVENTION

The present invention is directed to an improved cookware handle which is fabricated from metal so as to allow the cookware to be used under a broiler without damaging the handle, yet which remains cool to the touch in use.

According to this invention a cooking pan is provided which comprises a pan body, a metal insert, and at least three elongated metal struts, each rigidly mounted between the metal insert and the pan body such that the struts and the insert cooperate to form a handle for the pan body. These struts are characterized by a radiating surface area A, a total cross-sectional area X, a thermal conductivity k, and an individual length L. The product $kX/L$ is not greater than about 0.03 BTU/(hour-°F.) and A is not less than about three square inches. It has been discovered that this combination of structural elements provides a rigid, effective handle which remains cool enough to touch even when the pan body contains boiling water.

Preferably, the insert is angled upwardly approaching the pan body at an angle of between 15° and 45°. This angle provides a handle which is comfortable to use and at this angle the user has more control and strength than with a standard horizontal handle.

The invention itself, together with further objects and attendant advantages, will best be understood by reference to the following detailed description, taken in conjunction with the accompanying drawings.

BRIEF DESCRIPTION OF THE DRAWINGS

FIG. 1 is a side elevation of a cooking pan which incorporates a presently preferred embodiment of this invention.

FIG. 2 is a top view of the embodiment of FIG. 1.

FIG. 3 is a cross section taken along line 3—3 of FIG. 1.

FIG. 4 is an enlarged view in partial cutaway of a portion of the elevation of FIG. 1.

DETAILED DESCRIPTION OF THE PRESENTLY PREFERRED EMBODIMENTS

Turning now to the drawings, FIG. 1 shows a side elevation of a pan 10 which incorporates a presently preferred embodiment of this invention. The pan 10 includes a pan body 12 which defines a flat bottom surface 14 and an upper lip 16. A cylindrical stud 18 is welded to the outer surface of the pan body 12 to project a short distance. In this preferred embodiment, the pan body 12 is shaped as a skillet, and is preferably formed of electrolitic pure copper having a thickness of about 0.093 inches at the bottom 14 and 0.045 inches at the wall.

The pan 10 includes a handle 20 which includes a stainless steel tubular insert 22 that defines a pair of spaced axial grooves 24 on its outer surface. The insert 22 is mounted to the pan body 12 by an upper wire 26 and a lower wire 36. The upper wire 26 defines two ends 28 and a bight section 30. The ends 28 are each welded to the pan body 12 at a respective weld line 32. This weld line 32 extends for about one-half inch at the junction between the end 28 and the lower edge of the lip 16. In addition, the upper wire 26 is welded to the insert 22 at welds 34. The lower wire 36 defines a lower end 38 and an upper end 42. The lower end 38 includes an opening 40 sized to receive the stud 18. Following assembly the stud 18 is welded in place to the lower end 38 of the lower wire 36 by a weld 46. The upper end 42 of the lower wire 36 fits within the insert 22 and is welded in place by a weld 44. Conventional TIG welding with copper has been found to be suitable for the welds 32,34,44,46.

In this preferred embodiment the wires 26,36 are preferably 0.188 inches in diameter and formed of a stainless steel such type 304 stainless steel. The thermal conductivity k of the wires 26,36 is 0.67 BTU/(hour-inch-°F.); the total cross-sectional area of the wires 26,36 between the insert 22 and the pan body 12 is 0.083 square inches; and the length L of the wires between the insert 22 and the pan body 12 is about 3 inches. Given these parameters the external area of the wires 26,36 is 5.3 square inches and the factor $kA/L$ is 0.0062 BTU/(hour-°F.). It has been found that for this embodiment the end of the insert 22 nearer the pan body 12 never exceeds 90° F. when ambient temperature is 65° F. and the pan body 12 contains boiling water. In general, it has been determined that if the product $kA/L$ is kept less than 0.03 BTU/(hour-°F.) and the radiating surface of the wires 26,36 is kept larger than 3 square inches, then the insert 22 will remain cool enough to touch with the bare hand even when water is boiling for long periods of time in the pan body 12.

Another important feature of the pan 10 relates to the orientation of the insert 22. The insert 22 defines a holding axis 50 which in this embodiment is oriented at an angle of 25° with respect to the horizontal plane defined by the bottom 14. It has been determined that such an upwardly sloping geometry decreases muscle loading in the forearm and reduces muscle fatigue and maximizes the comfort, strength and control of the user. In general, any angle between 10° and 45° between the holding axis 50 and the plane of the bottom 14 provides important advantages in terms of user comfort. It is also significant that the wires 26,36 incline upwardly from the pan body 12 to the insert 22. This arrangement ensures that the outer end of the insert 22 is higher than the bottom 14 of the pan body 12.

In order better to define the preferred embodiment of this invention the following details of construction are provided. It is of course intended that these details in no way limit the scope of this invention. In the preferred embodiment the pan body 12 is grit blasted with 60 to 100 grit alumina in order to roughen the surface and then a nickel coating is applied using arc spray equipment manufactured by Metalizing Corporation of America. During the arc spray process two nickel wires are brought close together and an arc is established therebetween. Then 100 psi air is blown through the arc in order to spray the molten nickel onto the copper pan body 12. The pan is preferably rotated during the arc spray process at a peripheral speed of several inches per second, and the nickel plating is preferably about 0.004 inches thick. This nickel plating provides a hard, corrosion resistant layer which is still sufficiently thin so as not to interfere with thermal conduction of the copper pan body 12. The insert 22 is preferably formed of sheet stainless steel welded together at a bottom seam 21.

As used herein the term "pan" is intended in its broad sense to cover flat pans such as skillets and the like, as well as deeper pans such as sauce pans, pots and the like. Though one particular geometry of pan has been shown in the attached drawings, it is intended that the term be given a broad meaning, and that the following claims not be limited to pans of any particular configuration.

Of course, it should be understood that a wide range of changes and modifications can be made to the preferred embodiment described above. It is therefore intended that the foregoing detailed description be regarded as illustrative rather than limiting, and that it be understood that it is the following claims, including, all equivalents, which are intended to define the scope of this invention.

We claim:

1. A cooking pan comprising:
   a pan body which comprises a bottom that defines a horizontal plane;
   a tubular metal insert which defines an outer end and an inner end;
   a first metal wire which defines a central bight section which extends around and is secured to the insert and two end sections which are rigidly secured to the pan body;
   a second metal wire which is secured at one end to the pan body and at the other end to the inner end of the insert, wherein the second wire is spaced vertically from the first wire at the insert and at the pan body;
   said insert defining a holding axis angled at about 15°–40° to the horizontal plane with the inner end farther from the horizontal plane than the outer end;
   said wires extending upwardly between the pan body and the insert with respect to the holding axis such that the inner end of the insert is positioned above the end sections of the first wire;
   said wires characterized by a radiating surface A between the pan body and the insert, a total cross-sectional area X, a thermal conductivity k, and a length L between the pan body and the insert, wherein the product kX/L is no greater than about 0.03 (BTU/hour-°F.), and wherein A is no less than about 3 square inches such that the insert remains cool enough to touch even when the pan body contains boiling water.

2. The invention of claim 1 wherein the holding axis is aligned at about 25° to the horizontal plane.

3. The invention of claim 1 wherein the insert and the wires are formed of stainless steel and wherein k is about 0.67 BTU/(hour-inch-°F.).

4. The invention of claim 1 wherein the diameter of each of the wires is less than about 0.2 inches and L is about 3 inches.

* * * * *